(12) United States Patent
Richards

(10) Patent No.: US 8,262,337 B2
(45) Date of Patent: Sep. 11, 2012

(54) UTILIZATION OF RENEWABLE ENERGY SOURCES WITH A PASSIVELY SAVONIUS ROTOR (PVSR)

(76) Inventor: William R. Richards, Springfield, VA (US)

( * ) Notice: Subject to any disclaimer, the term of this patent is extended or adjusted under 35 U.S.C. 154(b) by 751 days.

(21) Appl. No.: 12/318,396

(22) Filed: Dec. 29, 2008

(65) Prior Publication Data
US 2009/0169355 A1 Jul. 2, 2009

Related U.S. Application Data

(60) Provisional application No. 61/016,644, filed on Dec. 26, 2007.

(51) Int. Cl.
*F03B 15/06* (2006.01)
(52) U.S. Cl. ........................................................ 415/4.1
(58) Field of Classification Search .................. 415/1, 8, 415/4.1, 4.2, 4.4, 110, 2.1, 17; 416/197 A, 416/111, 132 B, 204 R; 290/1 R, 44, 54, 290/55
See application file for complete search history.

(56) References Cited

U.S. PATENT DOCUMENTS

| | | | | |
|---|---|---|---|---|
| 4,997,414 A | * | 3/1991 | Camara et al. | 475/330 |
| 6,864,597 B1 | * | 3/2005 | Ricker | 290/55 |
| 6,962,478 B2 | * | 11/2005 | Tsipov | 415/4.2 |

OTHER PUBLICATIONS

IEEE Standard 1094-1991, 1991, IEEE, pp. 7-30.*

* cited by examiner

*Primary Examiner* — A. Sefer
*Assistant Examiner* — Nikolay Yushin
(74) *Attorney, Agent, or Firm* — Mattingly & Malur, PC

(57) ABSTRACT

A Savonius Rotor may use the flow of wind or the flow of water from undersea current or tidal movement. The Savonius Rotor is passively vented and has a base support ring, and a space frame support structure supported on the base support ring. The space frame has building block cube elements which facilitate the ease of on-site assembly and erection. The space frame support structure supports sails and louvered panel assemblies for each of the cube elements. The louvered panel assemblies close passively when facing into the wind or ocean flow and open passively when moving into the wind or ocean flow. A distributed gearbox including planetary power takeoff assemblies located on the perimeter of the base support ring is provided for transfer of the extracted wind or ocean flow through the planetary power takeoff assemblies at points arrayed about the perimeter of the base ring.

17 Claims, 10 Drawing Sheets

Figure 8 Detail A

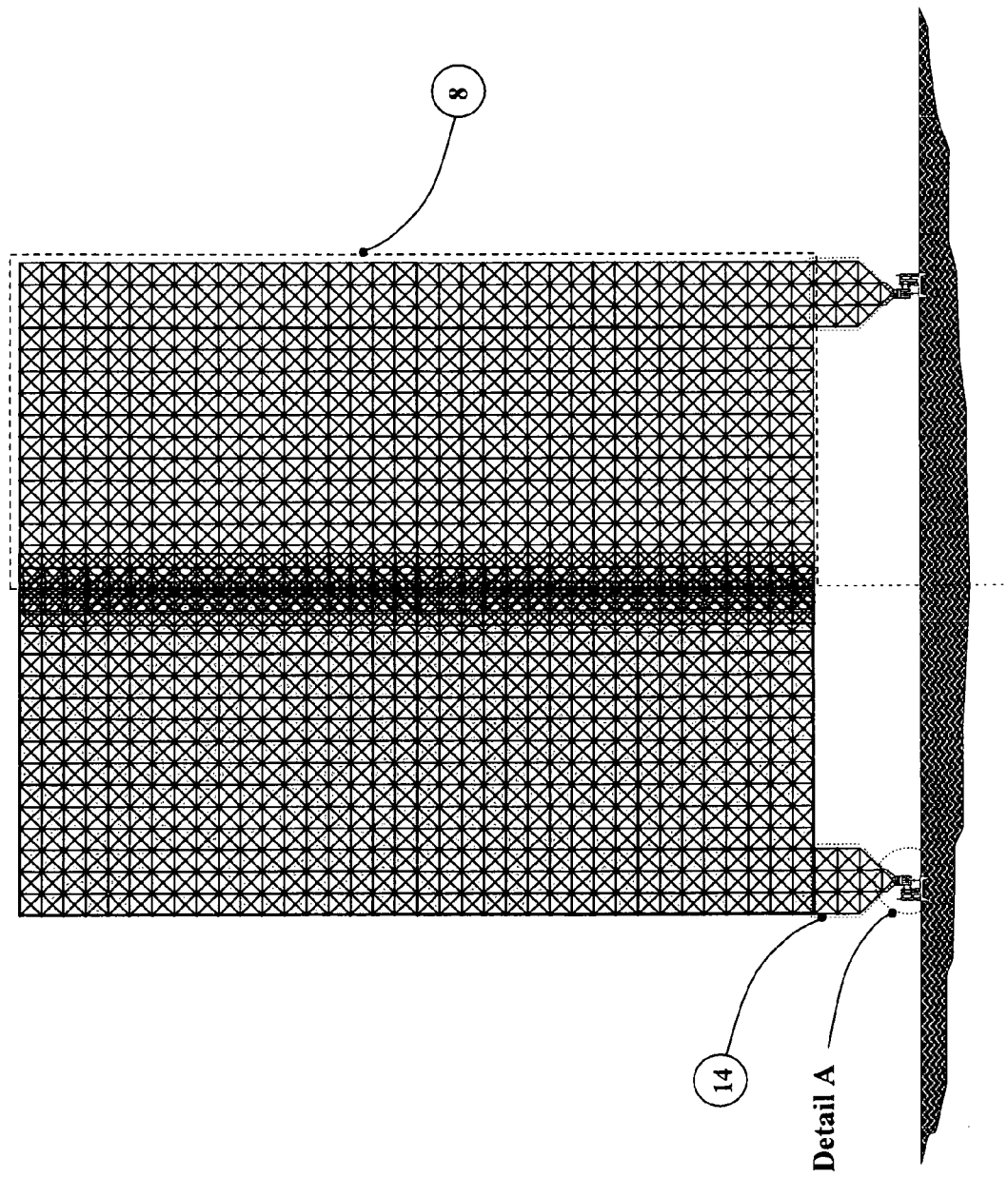

UTILIZATION OF RENEWABLE ENERGY SOURCES WITH A PASSIVELY SAVONIUS ROTOR (PVSR)

CROSS REFERENCES TO RELATED APPLICATIONS

This application claims the benefit of U.S. Provisional Application No. 61/016,644, filed Dec. 26, 2007 to the same inventor as herein, the entire disclosure of which is incorporated herein by reference.

BACKGROUND OF THE INVENTION

1. Field of the Invention

The present invention relates generally to a wind or ocean flow passively vented Savonius Rotor assembly.

2. Description of Related Art

Horizontal-axis wind turbines (HAWTS) and Vertical-axis wind turbines (VAWTS) are susceptible to the Betz Limit criteria (i.e., $^{16}/_{27}$ths), whereby they lose at least 41% of the theoretical extractable energy from either wind velocity OR water velocity. Thereafter, the energy extraction process is solely dependent on the turbine overall efficiency. The turbine overall efficiency ($\eta_o$) consists of blade aerodynamic efficiency ($\eta_b$) times the associated mechanical efficiency ($\eta_m$) times the electrical conversion process efficiency ($\eta_e$) to produce the resultant electrical power. These efficiency terms are combined into an expression to determine the maximum extractable energy in Watts/m² vs. the wind or current velocity. This can be represented by the following expression:

Watts/m² = 0.50 × (ρ, kg/m³ × (wind vel., m/sec.)³ × Betz Limit × $\eta_o$ where ρ=1.225 kg/m³ at sea level elevation and 68° F.

or, Watts/m² = 0.363 × (wind vel., m/sec.)³ × ($\eta_b$ × $\eta_m$ × $\eta_e$)

Current wind turbine industry practice is to measure the output power from their generators without consideration of the power conditioning and conversion processes necessary for establishing grid compatibility. The reported total Watts generated is then simply divided by the rotor swept area to determine the specific energy at that wind velocity. These curves are then used in sales brochures to present documented performance capabilities. Unfortunately, this practice assumes that energy is being uniformly extracted over the entire swept area. This is not the case, as the rotor delivery torque times the rotor RPM is proportional to the input power supplied to the gearbox. The torque is composed of the summation of lift and drag forces acting at varying distances along the blade from the rotor hub to the blade tips. These forces are proportional to the blade rotational velocity² at any particular distance from the hub. Integration of the resultant torque as a function of incremental distances along the blade will show that ~90% of the energy extracted is being provided by the outer 30% of the rotor disc. (or ~50% of the area) This leads to the surprising conclusion that the past practice of using the entire swept area of the rotor disc to estimate the energy extracted must be reduced by half, revealing that reports of blade performance aerodynamic efficiency are ~2× higher than is actually the case.

It is evident that for conventional wind turbines, wind velocities remain unchanged as they pass through the inner 70% of the rotor disc, causing large flow-field discontinuities downstream. Mixing of the highly disturbed outer flow field with that of the essentially undisturbed inner flow field, generates massively swirling eddies downstream of the rotor.

The blade aerodynamic efficiency $\eta_b$ is determined by the lift/drag ratio ($C_L/C_D$) of the blade. This ratio is usually low, because a sufficiently strong blade cannot be created to resist the induced bending, without requiring a large section modulus. A large section modulus requires thick blade sections, typically 25% to 35% of the chord dimension, which results in excessive drag. The resultant $C_L/C_D$ is typically below 44, yielding an aerodynamic efficiency of 42% to 48%. A high efficiency thin section blade, such as the NACA 6412, with a $C_L/C_D$ of >110, cannot be used in wind turbines because of this strength requirement.

The mechanical efficiency ($\eta_m$) is primarily reflected in the turbine gearbox, required to convert the 16-25 RPM of the multi-bladed rotors to 1200 RPM and higher, in order to drive one to four generator assemblies. These high-ratio, multi-stage gearboxes are required to achieve the desired 50:1 to 75:1 speed increases. As each stage is only 98.5%±0.5% efficient, a four-stage gearbox would therefore have a maximum efficiency of 92% to 96%.

Finally, the electrical efficiency ($\eta_e$) consists of both the generator efficiency and the associated conversion process efficiency needed to achieve the requisite high voltage, 3-phase, 60 Hz power for grid compatibility. A typical high performance generator efficiency is between 88% to 92% for either AC or DC embodiments. With a transformer, for use with an AC generator, the efficiency is typically between 96.5% to 98.5% yielding a net overall average of 88%. With use of a DC generator, with an efficiency of 88% to 92% and a solid state inverter with an efficiency of 97% to 98%, the net overall average remains at 88%.

In summary: a blade efficiency of 45%, a gearbox efficiency of 96%, and a power generation and conversion efficiency of yields a net system overall efficiency of 38%, or $(\eta_b)(\eta_m)(\eta_e)=\eta_o$. A tabulation of the performance for these prior art designs would confirm this value for the net overall efficiency and show that, once the Betz Limit is included, the total specific energy extracted is approximately 22.5% of the theoretical wind energy.

SUMMARY OF THE INVENTION

Existing prior art HAWT designs, such as the Vestas V80-2.0 MW wind turbine, have an overall weight of 1080 tons, including a rotor at 90 tons, nacelle at 150 tons, 80 meter tall tower at 170 tons, and a foundation at 760 tons. The yaw drive assemblies must be capable of handling a 150-ton static load times a to-be-determined design margin of safety. Each tower must have a cleared 1.5-acre lay down area to permit on-site preassembly of the wind turbine rotors and placement of the blades, nacelle, and the three or more tubular steel tower sections.

The logistical and infrastructure impact to move such large assemblies to remote wind farms demands high load capacity roadways for the transport vehicles and constitutes a major Balance of Station cost for new installations. Roadways must be engineered to support the passage of 330-ton crawler cranes and Restricted Access Vehicles (RAVs) with a very large turning radius. Finally, the logistical impact with respect to traffic congestion in the site of the wind farm is severe, with up to 120 one-way trips for material and equipment per MW of installed capacity.

HAWT wind turbines are complex structural assemblies with many eigenvalues. This complexity, coupled with little or no structural damping (<3% hysteretic), makes them highly susceptible to blade/rotor interactions with the tower structure, potentially leading to multiple modes of undesired forced vibratory response. Near-resonance exciting forces can drive the rotor blades into large displacement amplitudes that can lead to catastrophic failure from excessive bending stresses. These vibratory amplitudes are then hard-coupled into the gearbox, and subsequently into the generator assembly. Neither of these assemblies is designed to withstand such amplified forces which, due to the lack of appreciable damping, can be multiplied by a factor of 20× or more.

HAWT rotor blades, weighing 30 or more tons, are extremely complex, and expensive tooling of their composite materials contributes to their high cost of fabrication. They are susceptible to catastrophic over-speeding in high wind conditions, resulting in serial failure in their redundant pitch controlled furling, blade tip air brakes, and/or main shaft braking systems. Additional catastrophic, life-threatening, failures occur when stress fractures lead to thrown blades, generating massive imbalance, leading to destruction of the component elements within the nacelle, and ultimately to blade impact with the steel tower and its resultant destruction.

The power takeoff point from the rotor main shaft is very difficult to access for performing maintenance and repair operations. The major mechanical and electrical components, including the gearbox (~36 tons), rotor assembly (~90 tons) and generator assembly (3 to 6 tons), is typically packed into a cramped nacelle, located between 70 to 100 meters above ground. Major repair requires a 330-ton crawler crane to remove the rotor and nacelle from the tower for repair.

HAWTs typically require heavy, multi-stage gearboxes at speed increase ratios from approximately 65:1 up to >85:1 for driving the generator(s). Both the gearboxes and the generators are highly susceptible to expensive and time-consuming failures, typically occurring within the first 2 to 3 years. Industry inability to achieve theoretical lifetime goals of 20 years or more for gearbox reliability is forcing a number of wind turbine manufacturers to look at alternative approaches, such as direct-coupled low speed generator configurations. Unrealized mean time goals between failures, mandating warranty periods limited to 2-3 years, and high operating and maintenance costs for gearboxes, are directly traceable to gear teeth or bearing failures caused by unexpected overload conditions, and/or failure of the lubrication system.

Existing HAWT gearbox designs are manufactured to the highest precision levels (AGMA class 12 and 13) that result in expensive tooling and time consuming manufacturing processes to meet the design tolerances. Before shipment, a mandatory 24-hour "run-in" is performed to observe the increased particle count generated over time, using the recirculated lubrication oil quality levels in the gearbox filtration system to indicate the degree of "wearing-in" of the gearbox itself. Although this process noticeably improves the operating efficiency of the gearbox in the relatively short time of 24 hours, once the particles are generated, they immediate initiate micro-pitting and subsequent accelerated wear.

The gearboxes are highly sensitive to loss of lubricity at temperatures above 180° F., causing the accumulation of gum and varnish, accelerating tooth wear and the buildup of backlash, and increasing failure from sudden overload conditions. The result is catastrophic tooth failure. The recirculation system must be pervasive throughout the gear train in order to mitigate hot spot generation while removing up to 360,000 BTUH from the gearbox at maximum loading. Additionally, a large 1.5 MW gearbox might hold 200 gallons of lubrication oil, which must be changed out semi-annually. In the event of a leak or rupture in the gearbox case, or in the associated piping recirculation and filtration system, a massive cleanup/remediation effort must be initiated.

These gearboxes must be sized for delivery of high levels of torque at low input speeds. They are typically sized at 500,000 ft-lbs with a typical 1.5× design factor-of-safety input torque for a 1.5 MW size wind turbine at 21 RPM. Unfortunately, this safety factor is not sufficient to cope with the highly variable and very large imposed loads being transmitted into the gearbox by the rotor assemblies, which is a primary causal mechanism for inducing gearbox failures.

The gearbox failure is instigated primarily by bending or deflection of up to ±1.5 meters for a 40-meter blade length, as the blades move from Top Dead Center (TDC) to Bottom Dead Center (BDC) with each rotation. Blade loading shifts rapidly as the blades attempt to accommodate a velocity profile that is spread over an elevation difference of 80 meters or more. Assuming Class 4 wind conditions and a $\frac{1}{7}^{th}$ power wind shear exponent, and with a 5.8 meter/sec wind velocity at a reference elevation of 10 meter hub height, the BDC position of an 80 meter diameter rotor on a 90 meter tall tower would be 50 meters, and its velocity would be 1.259 times 5.8 or 7.3 meter/sec. However at the TDC position, the velocity would be 1.369 times 5.8, or 7.94 meters/sec. As the theoretical energy of the wind is proportional to the velocity cubed, the watts/m$^2$ to be absorbed is 1.287× higher at TDC. This higher force component bends the blade backwards toward the tower. As the blade circles to BDC, the blade is unloaded and bends away from the tower. This constant bending fluctuation leads to a very large number of cumulative fatigue cycles in a very short time. Typical accumulated fatigue cycles over a period of one year would exceed ten million cycles, assuming a nominal 21 RPM rotating speed for an 80 meter diameter rotor with a Tip Speed Ratio of 6.4, and an average annual wind velocity of 7.3 meters/sec. The magnitude of the fatigue cycle is equivalent to a 1.5 MW wind turbine assembly operating with a ±28.7% "torque ripple" pulse per blade at a frequency of approximately one Hertz. This torque ripple alone can induce early gearbox failure. However, coupled with wind gusts of a similar magnitude (or +28.7% of average wind speed) the cumulative effect of the second term would yield a summed effect, resulting doubling the velocity. This yields an 8× increase in the fluctuating wind energy (due to the velocity cubed effect) or 2.30 times the nominal design loading with each cycle. Providing a sound mechanical design for this overload condition is a formidable challenge, and appears to be one of the most likely reasons that a large number of wind turbines lie idle, awaiting repair.

At 6.0× to 6.4× tip speed ratios, the resultant wind velocity is a primary causal mechanism of noise generation and generation of violent turbulent eddies and swirl effects off of the blade tips. The separation of the trailing edges of the blade generate mid-frequency audible tones and the "swoosh, swoosh" noise of the blade passing in front of the tower. As acoustic noise generation increases as the fifth power of RPM, a doubling of RPM yields a 32-dBA increase. Blade tip speeds are proportional to the number of blades; a 3-bladed wind turbine with a TSR of 6.4, yields an equivalent RPM of 21 and a tip speed of 215 mph. Bird kill potential for these prior art designs is obviously quite high.

The turbulent eddy and swirl of these prior art HAWT designs exacerbate both the downwind and crosswind effects of adjacent wind turbine assemblies, and induce higher levels of discontinuity to the incident wind of the partially shaded adjacent downwind and crosswind turbines. Current practice is to space these adjacent wind turbines 10× rotor diameters for downwind turbines and 5× rotor diameters for crosswind turbines. It is a well-known phenomenon that both downwind and crosswind turbines are less reliable than the front row, the lead turbine in a wind farm.

It is the objective of this invention, the Passively Vented Savonius Rotor (PVSR), to eliminate ALL of the prior art deficiencies described above. These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

FIG. 10 is an elevation view of the passively vented Savonius Rotor of the invention.

DETAILED DESCRIPTION OF THE INVENTION

Figure 1:
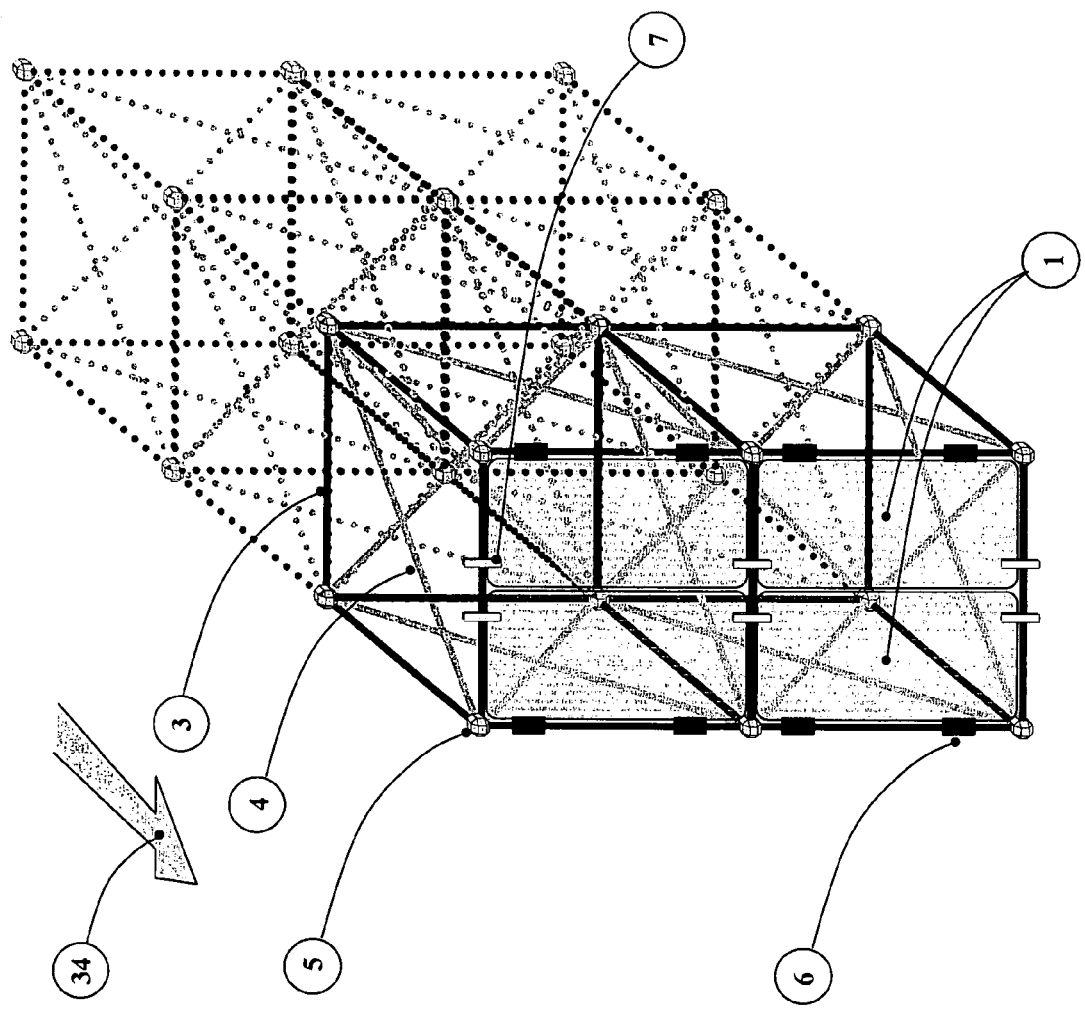
FIG. 1 is an isometric sketch of a portion of a Unistrut space frame support structure for the PVSR, with louvered panel subassemblies depicted in the closed position, as indicated by the wind direction.
Figure 2:
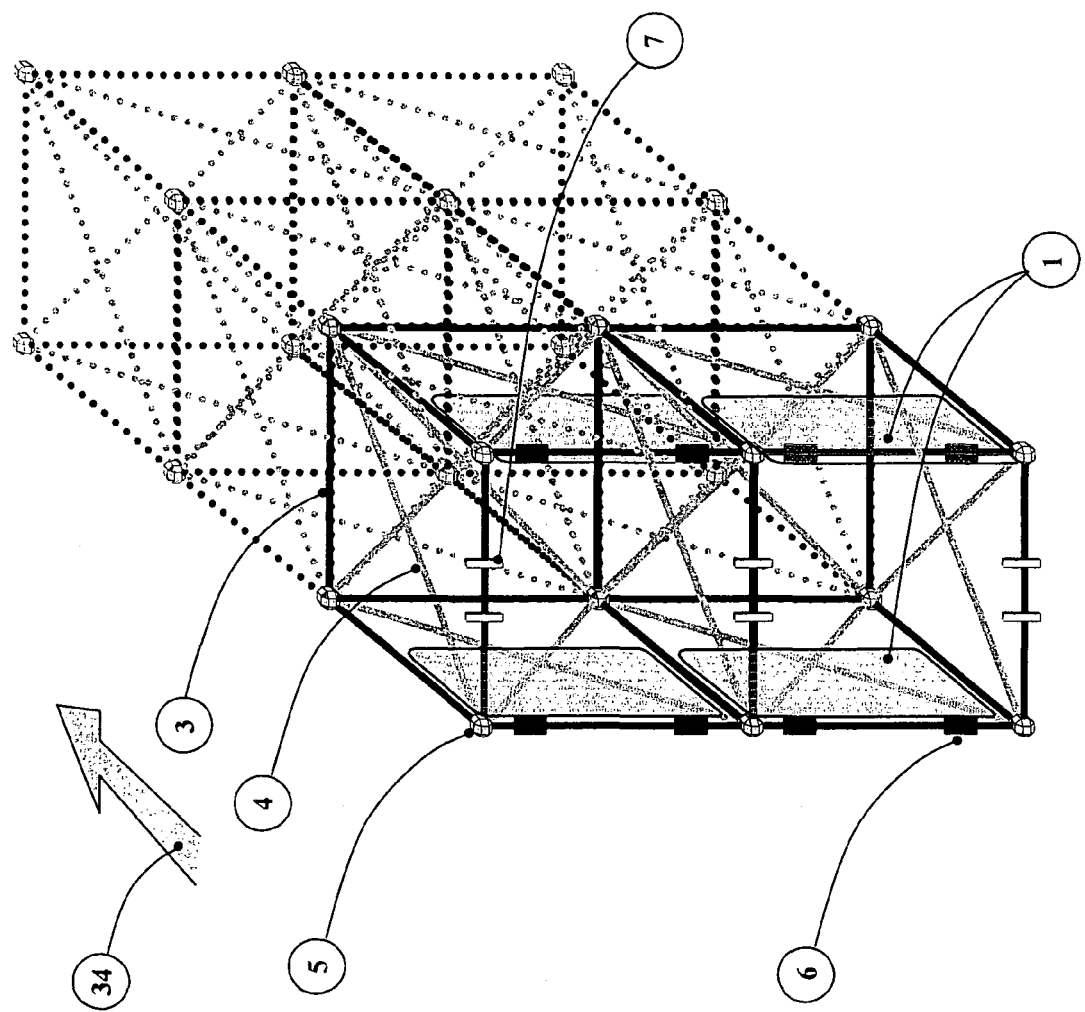
FIG. 2 shows the same space frame support with louvered panel subassemblies depicted in the open position, as indicated by a reversed wind direction.
Figure 3:
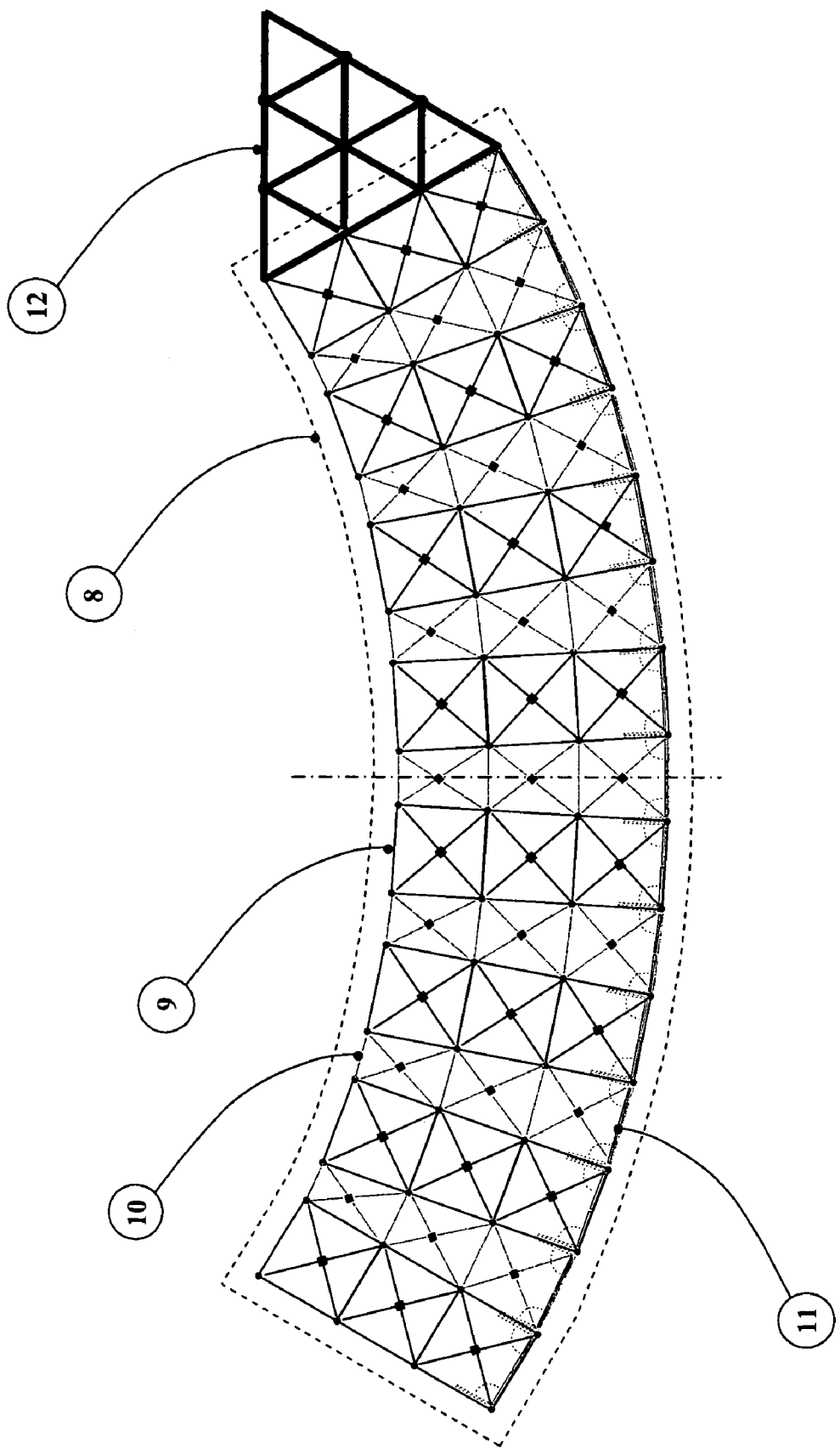
FIG. 3 depicts a plan view cross section of a single PVSR sail.
Figure 4:
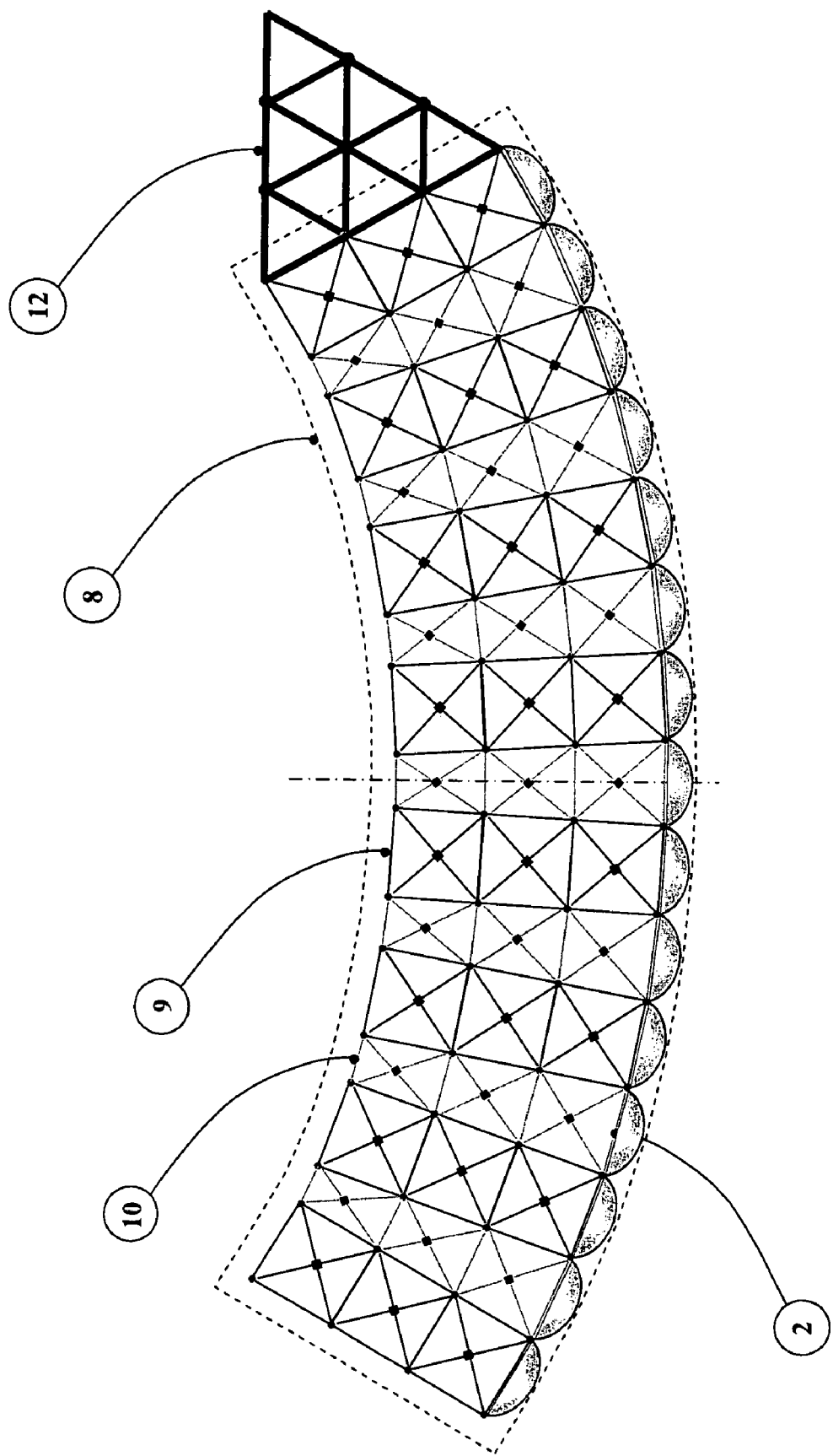
FIG. 4 depicts an identical plan view cross-section of a single PVSR sail, showing passive hollow hemispheres in place of the louvered panel subassemblies.
Figure 5:
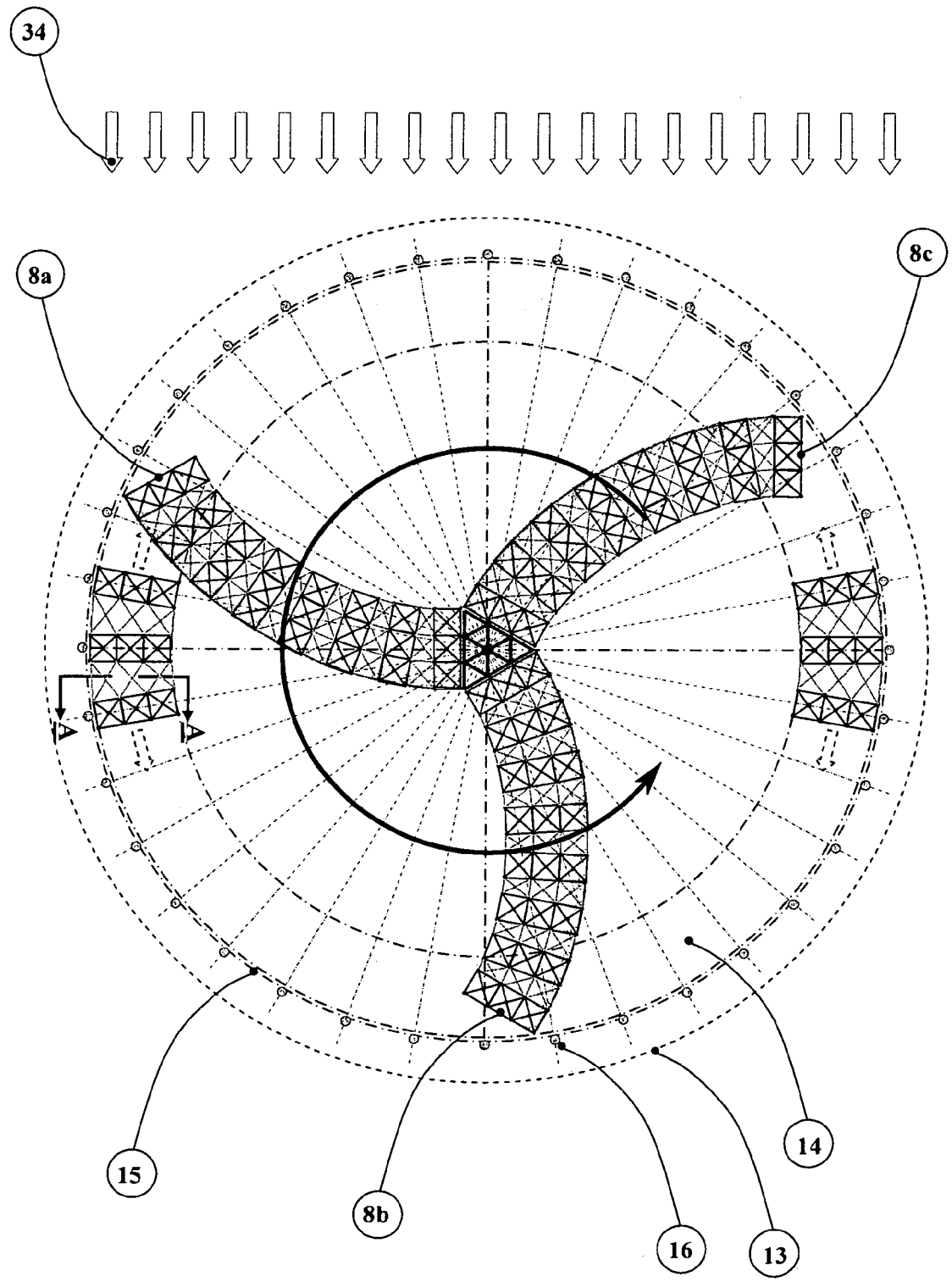
FIG. 5 depicts a plan view cross section of an entire three-sail PVSR rotor configuration.
Figure 6:
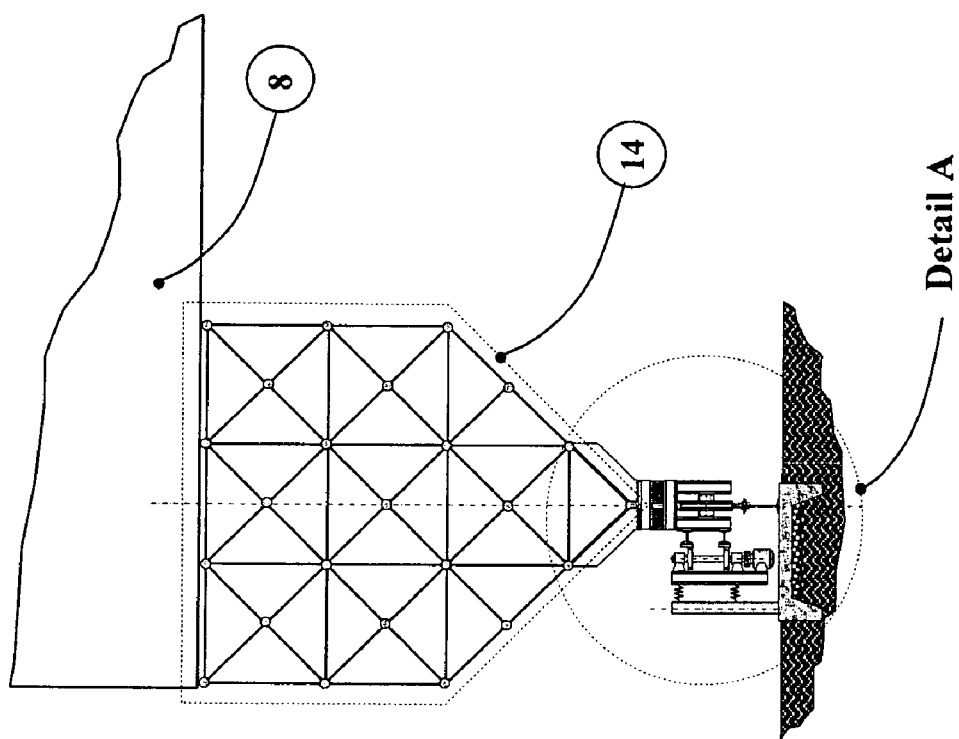
FIG. 6 depicts the PVSR rotor assembly base support ring vertical section view A-A, shown in FIG. 5 and also shown in the Detail A of FIG. 10.
Figure 7:
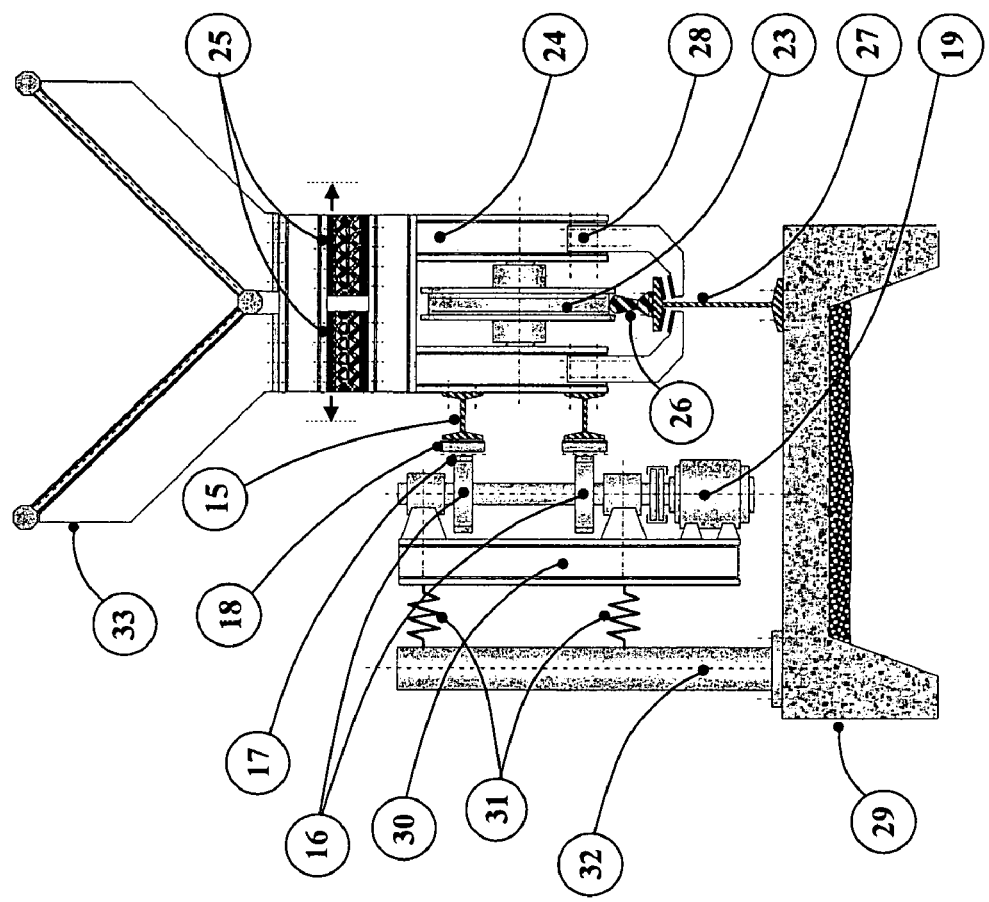
FIG. 7 depicts the expanded Detail 7 of FIG. 6 Power Takeoff configuration, with a direct-coupled alternator, according to another embodiment of the invention.
Figure 8:
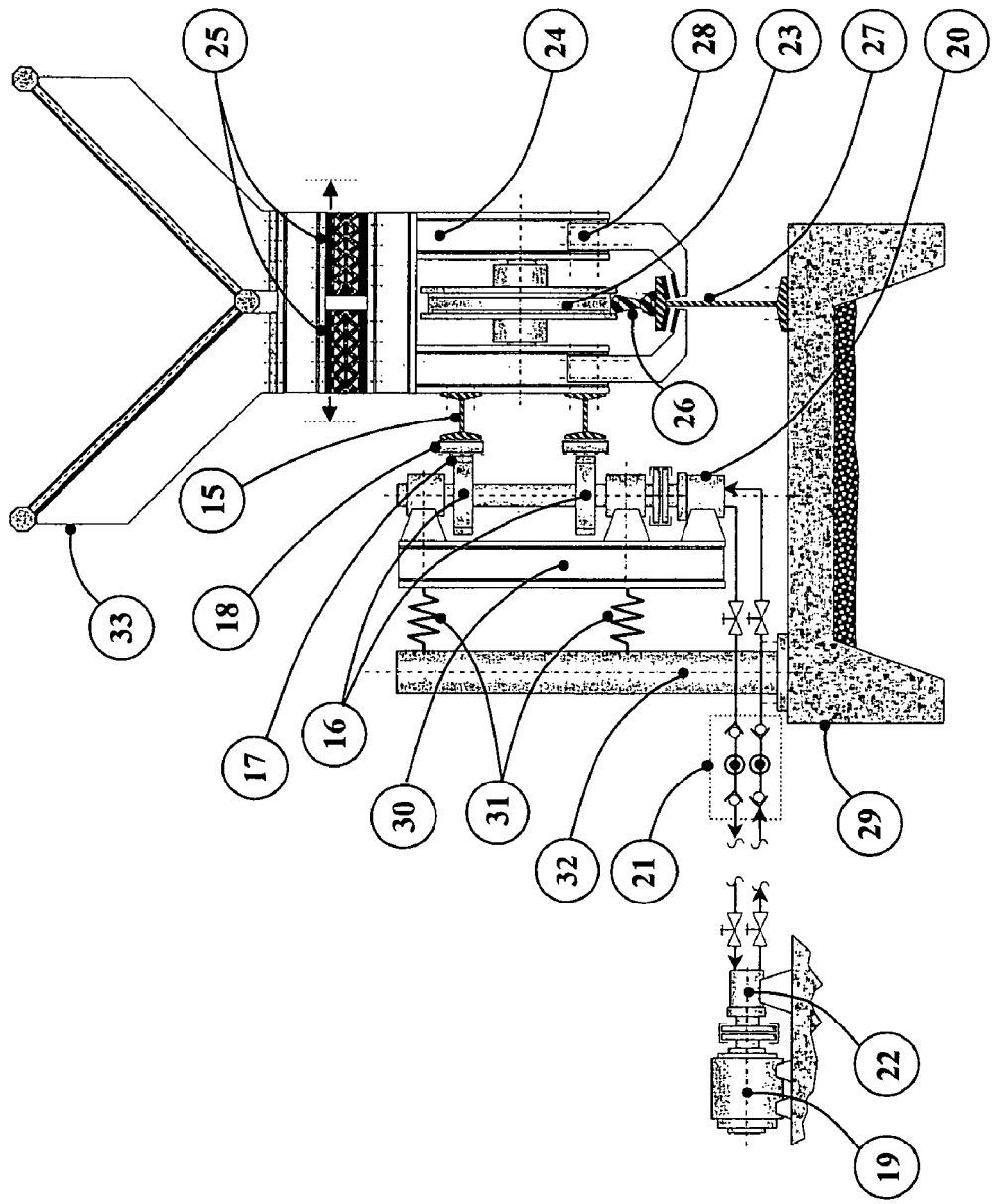
FIG. 8 depicts the expanded Detail A of FIG. 6 Power Takeoff configuration, with a similar hydraulic motor with smaller displacement coupled to the alternator to provide additional speed increase capability.
Figure 9:
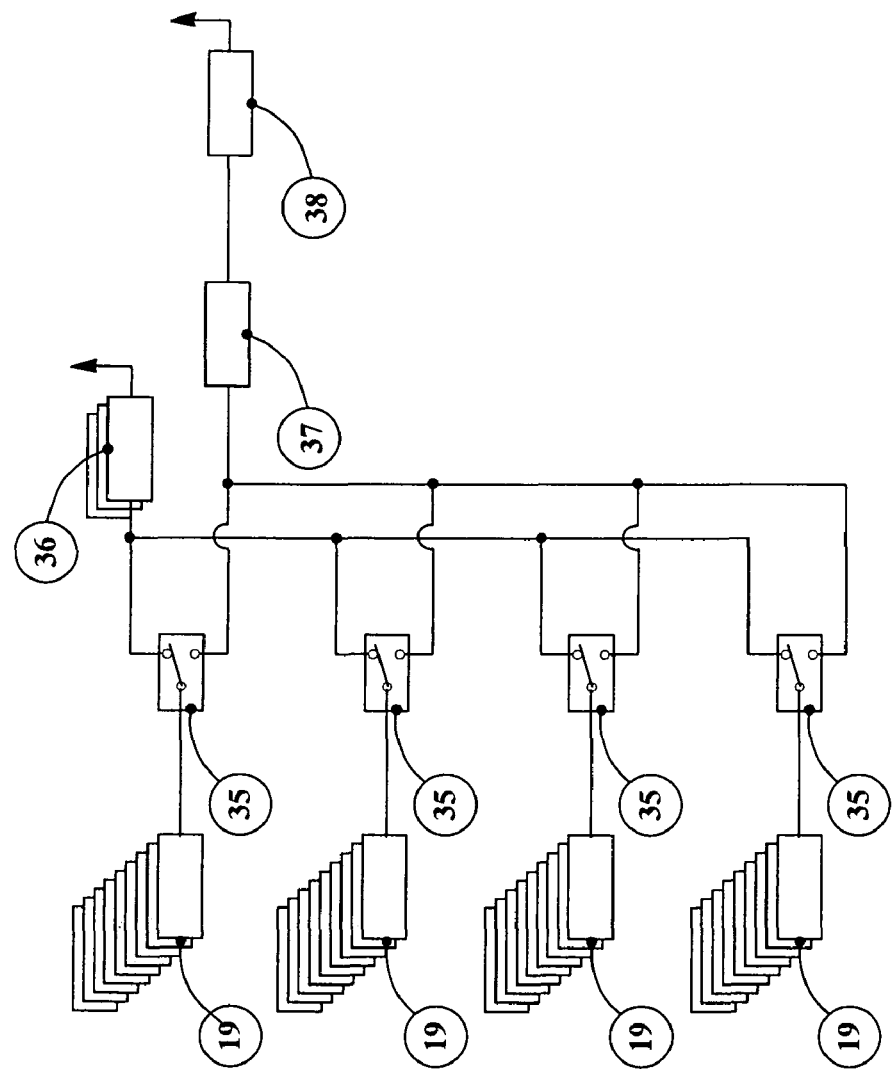
FIG. 9 is a schematic diagram of the HVDC output power management, for either grid connection via solid-state inverters or, alternatively, for use by electrolyzers to produce both hydrogen and oxygen.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any manner.

The Passively Vented Savonius Rotor (PVSR) provides much higher efficiency vs. existing designs by substantially eliminating the drag component(s) to its aerodynamic performance. Additionally, it eliminates the multistage gearbox, and replaces it with a lightweight, single stage configuration providing a speed increase ratio of up to 200:1. The PVSR, with its three sails configured as a self-supporting space frame structure, eliminates the need for a central free-standing tower, and allows all rotating bearing elements and power takeoff devices to be located at ground level. The PVSR employs an open, lightweight space frame support yielding a wind turbine structure that is 80% lighter than existing embodiments. Furthermore, this lighter structure yields significant savings and greatly reduced complexity for the PVSR foundation.

The substantial reduction in drag is accomplished by the use of lightweight vertical louvered panels 1, pivoted off of the vertical members of the space frame support structure 3. The chord members and cross-bracing elements 4, similar to the Unistrut® system, are connected to one another using precision die cast or similar rombicuboctahedron vertex connectors 5. These vertex connectors 4 provide a total of 18 threaded connection points for the preferably 2m long verticals and horizontals of the space frame support structure 3, and also for the cross-bracing elements 4. In one embodiment, pivoting of the louvered panels 1 is accomplished by torsion mounted spring-loaded pivot points 6 to the stationary edge of each panel, with the articulated edge of each panel allowed to swing through a 90 degree arc as it is spring-closed to mate with its adjacent panel. In other embodiments, the pivoting of the louvered panels does not require any biasing to permit the panels to be closed. Each set of a multiplicity of these louvered panels 1, sized as dictated by the space frame chord length, "opens" to the concave side of each sail 8 under the pressure generated by the sail "pushing" against the wind 34 or current, and "closes" towards the convex side of the sail under the pressure generated by the sail being driven by the wind 34. Stops 7 prevent the panels from opening outward from the space frame sail 8 structure.

The space frame sail 8 structures consists of sets of ganged 2 m building block modules 9, ganged three deep, and stacked up to 45 modules high, and which are connected to their adjacent ganged 2 m building block modules 9 via bridging braces 10 and 11. Bridging brace 10 and 11 lengths are chosen in such manner as to affect the desired cylindrical cross sectional shape of the sail. The bridging brace 11 length is exactly the same as the 2 m space frame support structure 2 elements, in order to allow mounting of the louvered panels 1. The sail 8 feature of the PVSR is terminated at the axis of rotation by an intermediate mast 12 structural interface between the sails, consisting of identical 2 m long space frame support structure 3 elements.

The three sail PVSR configuration 13, shown in elevation view in FIG. 10, can accommodate wind 34 or current from any orientation, without the need for a separate yaw mechanism. The PVSR provides a closed-off sail surface (8a) with respect to the wind 34 flowing as indicated by the arrows, and opened sail areas (8b and 8c) that provide very low drag resistance against the wind or current flow. The result is that one sail 8a is always closed-off to capture the flow 34, and the other two sails 8b and 8c are opened-up when moving against the flow. Drag losses are thereby reduced by as much as 90% and overall conversion efficiency of the sails is therefore increased. This compares to prior art blade designs with only a 40 to 45% efficiency, and yields up to a net 2× improvement. Overall conversion efficiency is therefore up to 90% times 98.5% times 88%, or 78%, versus the prior art efficiency of only 38%, and again, yields a 2× improvement. The resultant COP is therefore as much as 0.46, vs. past art designs with a COP of only 22%.

Further benefits are derived from the PVSR design, wherein the space frame design lends itself to the "Building-Block" approach for rotor on-site assembly and installation, and for subsequent modifications to expand the sail area, and/or to provide added stiffness to the sail by providing additional thickness to the sail. Both the width and height of the sails 8 may be increased by a factor of 1.5× or more, to realize up to a 3.375× increase in output power capability. Increasing the thickness of the sail by one additional building block module 9 would result in an 2.4× increase to its section modulus, and yields higher bending stiffness. Adaptability for very high wind conditions could thereby be realized and the need to "furl" the rotor blades (as required by prior art HAWTs) above wind speeds of 25 m/sec. would be unnecessary. Finally, the greatly enhanced stiffness, in conjunction with the greatly reduced mass, yields a structure with very high resonant frequencies (above 25 Hz vs. the fundamental frequency of rotation of 0.2 Hz). Resonance effects are kept at or below the 125$^{th}$ harmonic of the forcing frequency, and are thereby rendered insignificant. No amplification of the forcing frequencies is therefore possible.

The PVSR configuration 13 offers greatly simplified ease of fabrication and assembly, via use of structural elements similar to Unistrute, and preferably configured to consist of cubical "building block" space frame structural modules 9 preferably 2 m per side. These structural elements are used to affect the three cylindrical section sail 8 structures, and also used for the base structural support ring 14 for each of the sails. Bridging braces 10 & 11 connect each of the modular building block elements to one another. These elements provide generous tolerance margins to minimize any tolerance buildup, resulting a highly efficient PVSR configuration 13 with "Distributed Architecture".

The space frame sails 8 consists of 2 m cubes linked 15 Cubes wide×45 cubes High, and constructed of P1000T GR Unistrut, and assembled two to three sections deep to realize a high section modulus, and resultant high bending stiffness.

The maximum sustainable column loading per strut=2 Tons@a manufacturer recommended Factor-of-Safety>4.0. Each sail 8 consists of 64 vertical Unistrut® columns, and yields a net 128 ton load capacity at the base course. As the sail 8 weight is ~20 tons for steel plus 20 tons for the louvered panels 1, or a net 40 tons per sail 8 static load, the Factor-of-Safety is 12.8.

Honeycomb sandwich construction is used for the louvered panels 1, which are approximately 1.0 m wide×2.0 m high, and weigh approximately 30# each. This value ×1350 panels 1 for the three sails 7 equals 20 tons. Louvered panels 1 with torsion spring mounts 5 are "spring-loaded closed" on the concave face of the rotor, and may also employ active control linkages to actuate individual vertical columns of panels simultaneously.

A 4 m/sec wind velocity, or ~0.05#/ft$^2$ provides sufficient pressure to open the shutter doors when moving into the wind. Wind Loads on the louvered panels 1 at 15 m/sec wind velocity is approximately 0.77#/ft$^2$. This value ×21.5 ft$^2$ equals 16.5#, and approximately 46.0# at a wind velocity of 25 m/sec. All louvered panels 1 can be locked in the open position in high winds to prevent flapping and minimize induced over-turning moment and base shear forces.

The drag coefficient, $C_D$, of the flat louvered panels 1 parallel to the wind (i.e, open) is ~0.003 at a Reynolds Number of ~0.75×10$^6$ at 68° F. The drag coefficient for these flat panels is far smaller than the drag coefficient for the concave cylindrical sails 8 with concave surface facing directly into the wind 34, which is approximately 2.30, in contrast to the convex surface facing directly into the wind 34 at 1.20. As may also be readily observed, only one sail 8a can be facing into the wind 34 at any moment in time, while the other two sails 8b and 8c are in partial attitude with the convex surfaces facing partially into the wind 34. The effective area of the sails 8 is thereby reduced by the sine of the angle between the plane of any particular sail 8, and the approaching wind. Regardless, the net effect of having a three sail 8a, 8b, and 8c configuration with only one sail 8a fully exposed to the prevailing wind or current, versus the other two sails 8b and 8c in a partial shaded orientation leads to the realization of a relatively poor overall COP. Historical references point to typical Savonius Rotors yielding a maximum COP of only 12 to 15% vs. the current state of the art HAWTs operating at a COP of better than 22%. This relatively low COP could definitely justify the previous lack of popularity of the prior art Savonius Rotor technology.

Conversely, by means of the vertical louvered panels 1, it is possible to make up to 98% of the exposed area of the sail 8b or 8c "disappear" when the sail 8b or 8c are moving into the wind 34 or current, virtually eliminating the previous liability. The PVSR configuration 13 yields a COP of 0.46, which is approximately 3× better than prior art Savonius Rotor designs.

A PVSR configuration 13 with three partial cylindrical sails 8 30 m wide×90 m tall, constructed using 2 m cubical Unistrut building blocks 9, with each sail 8 three building blocks 9 thick, can provide 1.5 MW of peak output power at a wind 34 velocity of 15 m/sec (48 ft/sec). This extracted power level is equal to 556 Watts/m$^2$ vs. 393 Watts/m$^2$ for a Vestas V80-2.0 MW wind turbine. It should be noted that the swept area of the Vestas is 5,026 m$^2$, whereas the PVSR swept area is only 2,700 m$^2$. The PVSR is capable of providing up to 75% of the output power with 54% of the swept area.

By way of example, a 15 m/sec wind 34 velocity with a 30 m sail 8 radius, yields a maximum achievable circumferential velocity of 15 m/sec/(π×60 m), or 0.08 RPS or 4.8 RPM. This assumes a Tip Speed Ratio (TSR) of 1.0 as the limiting factor.

Assuming a force, F, equal to $[C_D \times \rho \times Area \times Vel_{avg.}^2]/[2 \times g_c]$, where $C_D$ equals 2.3 for a concave cylindrically shaped sail 8, and $(\rho \times Vel_{avg.}^2)/(2 \times g_c)$ equals 0.67#/ft$^2$, or F=1.54/ft$^2$, with a sail area of 29,060 ft$^2$, a 44,750# force is generated. The peak output SHP is therefore equal to 0.707×{(F×V)/550 ft-lbs per HP}, or approximately 2,000 SHP. This equals 1.5 MW output power.

The base ring 14 support structure permits implementation of a "Distributed Gearbox" design with exceptionally large torque capacity, by simply adapting to the very large differences between the pitch diameter of the main rotor assembly 13 and the greatly reduced pitch diameters of the power takeoffs 16. The number of power takeoffs 16 is solely limited by the OD (plus clearance required between adjacent takeoff) times the allowable number of takeoffs 16 being less than the circumferential pitch diameter of the inner driving element or bull gear 17. This facilitates the achievement of a very large speed change increase in a single virtual stage, with ratios from a minimum of 100:1 up to 200:1. This virtual gearbox stage is for "free", in that all of the structural elements necessary for its realization are part of the superstructure, except for the "teeth" 17. The Distributed Gearbox 15 therefore has essentially "zero" weight. A 100:1 ratio virtual gearbox would result by placement of the base ring 14 support structure approximately mid-span of the sails 8, and the 200:1 ratio virtual gearbox would be realized by placing the base ring 14 support structure at the outer perimeter of the three sails 8.

The "Distributed Gearbox" 15 preferably employs a large number (up to 360 each) of power takeoffs 16 arrayed about its perimeter, in order to minimize the drive torque applied to each power takeoff 16. By way of example, assuming 1.5 MW (2,000 SHP) are generated at 15 m/sec wind velocity by the PVSR at a rotational speed of 4.8 RPM, with the outer Pitch Diameter for the PVSR base ring 14 of approximately 200 ft, and using 360 power takeoffs 16 having a maximum occupied envelope feature size of less than 21 inches in diameter, and noting that in order to achieve a 200:1 ratio the planetary power takeoffs 16 must be 1/200ths of the base ring Pitch Diameter, the planetary power takeoffs 16 therefore would have a Pitch Diameter of 1.00 ft. The $2.2 \times 10^6$ ft-lbs of input torque are then broken down into 360 parts, or approximately 6,000 ft-lbs input torque per power takeoff. We can then determine the input torque for the planetaries at $\frac{1}{200}$ths, or 30 ft-lbs (360 in-lbs) at 960 RPM. This equals 5.5 SHP per takeoff, or 4.09 kW.

The applied force along the line of contact between the mating teeth of the perimeter bull gear or "Distributed Gearbox" 15 and the planetary power takeoffs 16 is 360 in-lbs per 6.00 inches Pitch Radius of the power takeoff pulley, or 60#. This force, distributed over a tooth width of less than 3.00 inches, would result in a line of contact force of only 20#/in. It may be observed that this line of contact force is quite low, and, thereby allows the use of elastomeric gear teeth 17 for the planetary power takeoff 16 gears to facilitate compliance. Tooth contact stresses may then be realized that are 20% or less of the compressive stress limits of the 90±5 Durometer teeth. Furthermore, the tooth profiles of the perimeter bull gear teeth 18 may be composed of an environmentally resistant plastic such as Delrin® or G-10® fiberglass reinforced epoxy materials. Lastly, the bull gear teeth 18 are preferably larger in face width than the planetary gear teeth 17 face width, such that vertical run-out of the plane of the PVSR bull gear 14 over Pitch Diameter distances of 200 ft or more may be readily accommodated. Most importantly, the need for lubrication is thereby eliminated.

Each of the planetary power takeoffs 17 is preferably a nominal 5 kW DC alternator 19 (28 VDC regulated output at up to 155 amps, similar to an Ecoair IJ-28V/155-IP) and wired in a 90×4 series/parallel array in order to achieve a net 2520 VDC at 600 amps output. This output is preferably switched using circuit breakers 35, similar to the GE Rapid CBs #2307, between either three 560 kW grid-connected inverters 36 similar to the Xantrex GT560E Grid Tie Inverter, or a set of high-pressure alkaline electrolyzers 37 for generation of high pressure $H_2$ and $O_2$ whenever the grid cannot accept electrical power. These alkaline electrolyzers 22 are preferably 690 each USGFC #3000-21 6-cell 3000 psig high pressure modules, each capable of producing 3.50 SCFH/cell hydrogen at ~1.80 VDC and 220 amps per cell, and stored in a large scale modular array of 176 ft³ capacity composite storage vessel 38. Peak output is ~14,500 SCFH, or 850 kg of hydrogen gas per day. This production capacity is above the DOE 2012 goal for refueling station size for the USA hydrogen economy.

A preferred means to drive the DC alternators 19 at their optimum speed of between 2100 to 2400 RPM employs "Distributed Hydraulics" as the second stage with an additional 2.50:1 ratio speed increase. This is accomplished by using a higher displacement Low Speed High Torque (LSHT) Motor 20 (similar to the ADM 100 or Char-Lynn 101-1035; 6.1 in³/rev.) at the planetary power takeoff point 16 and a 2.50× lower displacement LHST hydraulic motor 22 to drive the alternator 19. The difference between the larger displacement of the power takeoff motor and the smaller displacement of the variable displacement pumps allows the generators to be operated at the higher input speeds, solely dependent on the ratio of displacements chosen between the drive and driven pumps. A hydraulic ring main system 21 is preferably employed to provide a common reference high pressure supply line and low pressure return line header system, similar to the Savery Hydraulic Systems Ring Main System.

The PVSR configuration 13 will preferably be operated at a medium to low pressure of 160 bars, providing a fluid source of up to 5000 l/minute, distributed equally to the 360 DC alternators 19. Constant supply pressure is maintained in the Ring Main System 21 by adding additional alternator capacity to the circuit to reduce the supply pressure, and removing alternator capacity to the circuit to increase the pressure. Resolution is $\frac{1}{360}$th, or ±6.7 psig of the desired set point supply pressure. Approximately 14 liters of accumulator capacity is preferable installed in the high-pressure header to minimize any pressure transients.

The PVSR configuration 13 uses "Distributed Bearings" to adapt to the Savonius Rotor geometry, by employing a large set or railroad bogie "casters" 23 distributed uniformly about the outer perimeter. Railroad bogie casters 23 are ideally suited to a PVSR configuration 13, and offer a proven very high reliability (2,500,000 miles) lifetime for these bearing elements. Each bogie caster 23 is rated at 12.5 tons Basic Dynamic Capacity (BDC). With 180 of these arrayed about the base, they are loaded to less than 10% of their BDC. The casters 23 are mounted to a saddle support frame 24, which is affixed to a shear plane assembly 25, consisting of a set of three 10,000# capacity Lord Lattice Mounts or similar, to provide up to ±2.50 inches of excursion in the horizontal plane to accommodate thermal expansion and contraction effects. An adapter frame 33 is affixed to the shear plane assembly 25, and connects the bogie caster 23 to the base ring 14. The casters ride on a conventional steel rail 26, which is affixed to a preformed structural I beam 27, and grouted in place after final alignment for both vertical and radial run-out, to establish the desired Pitch Diameter geometry for the monorail track. An adjustable gap keeper assembly 28 is mechanically affixed to the saddle support frame 24, and employs low friction wear plates similar to Rulon or Delrin to prevent catastrophic over-turning moments from high winds toppling the PVSR. The structural I beam 27 is anchored to a nominal 2 m wide precision leveled concrete slab foundation 29. The finished surface run-out is preferable less than or equal to 0.125 inches over the entire circular path of the foundation. This is readily accomplished by flooding the form of the foundation prior to pouring concrete, and noting the water level about the perimeter of the foundation.

The planetary power takeoffs 16 with elastomeric teeth 17 are spring preloaded against the "Distributed Gearbox" 15 bull gear, with plastic teeth 18, by compressed air mounts, hydraulic cylinder or passive elastomeric shear/compression mounts similar to the shear plane assembly 24 mounts. The spring preloading assembly 31 preferably acts against the outer face of a vertically oriented bedplate assembly 30 to provide mounting support and alignment for the power takeoff 16 shaft-bearing pillow blocks, coupling and DC alternator 19 or hydraulic motor. An external structural column 32 is bolted to the foundation 29 to provide the requisite mounting and alignment features for the spring preloading assembly 31.

"Distributed/Load Sharing" architecture provides intrinsically higher reliability for the Mean Time Between Failure (MTBF) and the Operational Availability ($A_o$) for all of the distributed elements, due to the implementation of a very high level of intrinsic redundancy. Utilization of this massive redundancy eliminates the possibility of a single point failure causing a shutdown of the entire wind turbine. All rotating machinery, bearing elements, power generation and conversion elements of the PVSR configuration 13 are located at ground level, and are readily accessible for maintenance.

The PVSR configuration 13 offers capability for achieving an all-in Installed Capital Cost of under $400/kW, or ~25% or less than existing design(s). The PVSR reduces the cost of electricity by providing dual purpose DC electrical power output for either grid connectivity via an inverter 36, or for powering local electrolyzers 37 for turning water into high pressure $H_2$ and $O_2$, with provisions for high pressure gas storage 38 for subsequent use—either as a clean-burning fuel, for combustion in an auxiliary external gas-fired turbine generators, OR as a low cost (~$1.50/kg) fuel for hybrid vehicles, where 1 kg of $H_2$ is the energy equivalent of 1 gallon of gasoline (gge).

The PVSR configuration 13 may be oriented either as a Horizontal OR Vertical Axis Wind Turbine (HAWAT; VAWT). The horizontal orientation is highly preferable for undersea current or tidal applications, as it can take advantage of the current velocity gradient for extraction of maximum energy from the upstream current velocity and offer minimum drag resistance on the downstream side of the rotor assembly. The reduced drag is proportional to $Vref/(Vref-\Delta V)^2$.

The PVSR may also be rendered as a totally passive structure by replacing the articulated louvered panel 1 assembly by a simple static three-dimensional shape. Concern for the cumulative number of fatigue cycles for the torsion mount pivot points 6, estimated at a maximum of ten million cycles per year for each louvered panel 1 may thereby be rendered a moot issue.

This three-dimensional shape is preferably a hollow hemisphere 2, wherein the drag coefficient of the hemisphere 2 with convex shape facing into the wind 34 is approximately 0.38, and the drag coefficient of the convex shape facing into the wind 34 is approximately 1.42. The PVSR configuration 13 has a driven sail 8a having a driving factor of 1.42, and the two other sails 8b and 8c having a drag factor of 2×0.38, or 0.76. The net effect is to have a sail 8 with an apparent area of approximately 50% vs. a PVSR using louvered panels 1.

Adaptation of the PVSR wind turbine configuration 13 to 2.0 m/sec ocean current, tributary, or tidal operation indicates capability to have the same output power with 50% of the sail height. Individual sail 8 dimensions can be reduced from 30 m×90 m to 30 m×<50 m. The preferred embodiment tailors the PVSR height as required to permit operation in shallower water locations. This is accomplished by using "Distributed Slices" of the PVSR configuration 13 to utilize the Unistrut 2 m high modular building block 9 increments, stacked up as necessary in order to meet local water column constraints.

By way of example, the nominal 50 m height could be broken into 5 separate PVSR configurations 13 to create an array that could operate in 15 m depth waters, to produce ~300 kW of output power with each array element. Conversely, smaller diameter PVSRs could be employed with 5 m heights to provide a large array of 20 each 75 kW PVSRs.

The density ratio of seawater vs. air yields a 856× larger Watts/$m^2$ capability and the velocity$^3$ ratio at 2 m/sec vs. 15 m/sec yields a 0.0024× smaller Watts/$m^2$ capability. The resultant net improvement is 2× energy extraction capability. The most significant difference between a PVSR with wind vs. with seawater is the 0.133× reduction in RPM, going from 4.8 to 0.64 RPM.

The torque ratio of a seawater-based turbine is inversely proportional to the RPM ratio, or $2.2 \times 10^6$ ft-Lbs/$0.133 = 16.5 \times 10^6$ ft-lbs. This is ~7.5× the drive torque vs. the that of the wind turbine "Distributed Gearbox" 14 and will require twice the number of planetary power takeoffs 15, with 3.75× increase in the elastometic tooth 17 width to maintain equivalent compressive stress levels.

While specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A wind or ocean flow extraction mechanism, comprising:
    a passively vented Savonius Rotor assembly, including
        a base support ring,
        a space frame support structure supported on the base support ring,
        sails supported on the space frame support structure,
        said space frame support structure having building block cube elements which facilitate the ease of on-site assembly and erection,
        said sails including louvered panel assemblies for venting the sails of each of the building block cube elements, wherein said louvered panel assemblies close passively when facing into the wind or ocean flow and open passively when moving into the wind or ocean flow; and
    a distributed gearbox including planetary power takeoff assemblies located on the perimeter of the base support ring, such that transmission of the extracted wind or ocean flow is transferred to the planetary power takeoff assemblies at points arrayed about the perimeter of the base support ring,
    wherein said sails have panel assemblies positioned on the backside of the convex outer surfaces, or vertical faces of the sails, such that the sail area is placed parallel to the wind or ocean flow.

2. The wind or ocean flow extraction mechanism according to claim 1, wherein the distributed gearbox has first and second stage gearboxes including a hydraulic motor of low speed high torque in a first stage.

3. The wind or ocean flow extraction mechanism according to claim 1, wherein said distributed gearbox is coupled to distributed power generation elements, including DC alternators summed in a series parallel array, and directly coupled to a high voltage DC, low current, solid state grid tie inverter.

4. The wind or ocean flow extraction mechanism according to claim 1, wherein said distributed gearbox uses railroad bogie caster elements.

5. The wind or ocean flow extraction mechanism according to claim 1, wherein said planetary power takeoff assemblies of the distributed gearbox include elastomeric compliant teeth for coupling the input torque to the planetary power takeoffs.

6. The wind or ocean flow extraction mechanism according to claim 1, wherein said distributed gearbox is coupled to an alkaline electrolyzer array for the generation of $H_2$ and $O_2$.

7. The wind or ocean flow extraction mechanism according to claim 6, wherein said sails have a maximum Tip Speed Ratio (TSR) of approximately 1.0.

8. A wind or ocean flow extraction mechanism comprising:
    a passively vented Savonius Rotor assembly, including,
        a base support ring,
        a space frame support structure supported on the base support ring,
        sails supported on the space frame support structure,
        said space frame support structure having building block cube elements which facilitate the ease of on-site assembly and erection,
        said sails including louvered panel assemblies for venting the sails of each of the building block cube elements, wherein said louvered panel assemblies close passively when facing into the wind or ocean flow and open passively when moving into the wind or ocean flow; and a distributed gearbox including planetary power takeoff assemblies located on the perimeter of the base support ring, such that transmission of the extracted wind or ocean flow is transferred to the planetary power takeoff assemblies at points arrayed about the perimeter of the base support ring, wherein said sails may be incrementally reduced in overall height to adapt to wind and ocean conditions.

9. The wind or ocean flow extraction mechanism according to claim 8, wherein said distributed gearbox is coupled to distributed power generation elements, including DC alternators summed in a series parallel array, and directly coupled to a high voltage DC, low current, solid state grid tie inverter.

10. The wind or ocean flow extraction mechanism according to claim 8, wherein said distributed gearbox is coupled to an alkaline electrolyzer array for the generation of $H_2$ and $O_2$.

11. The wind or ocean flow extraction mechanism according to claim 8, wherein said sails have a maximum Tip Speed Ratio (TSR) of approximately 1.0.

12. The wind or ocean flow extraction mechanism according to claim 8, wherein said distributed gearbox uses railroad bogie caster elements.

13. A wind or ocean flow extraction mechanism, comprising:

a passively vented Savonius Rotor assembly, including a base support ring, a space frame support structure supported on the base support ring and having building block cube elements which facilitate the ease of on-site assembly and erection, said space frame support structure supporting sails and passive hollow hemispherical shells for each of the building block cube elements, wherein said passive hollow hemispherical shells close passively when facing into the wind or ocean flow and open passively when moving into the wind or ocean flow, and a distributed gearbox including planetary power takeoff assemblies located on the perimeter of the base support ring, such that transmission of the extracted wind or ocean flow is transferred to the planetary power takeoff assemblies at points arrayed about the perimeter of the base support ring.

14. The wind or ocean flow extraction mechanism according to claim 13, wherein said distributed gearbox is coupled to distributed power generation elements, including DC alternators summed in a series parallel array, and directly coupled to a high voltage DC, low current, solid state grid tie inverter.

15. The wind or ocean flow extraction mechanism according to claim 13, wherein said distributed gearbox is coupled to an alkaline electrolyzer array for the generation of $H_2$ and $O_2$.

16. The wind or ocean flow extraction mechanism according to claim 13, wherein said sails have a maximum Tip Speed Ratio (TSR) of approximately 1.0.

17. The wind or ocean flow extraction mechanism according to claim 13, wherein said distributed gearbox uses railroad bogie caster elements.

* * * * *